United States Patent [19]

Carson

[11] 4,384,673

[45] May 24, 1983

[54] HEATING AND COOLING SYSTEM FOR SERVICE MODULE

[76] Inventor: Miles T. Carson, 2390 W. Dartmouth, Englewood, Colo. 80110

[21] Appl. No.: 220,093

[22] Filed: Dec. 24, 1980

Related U.S. Application Data

[63] Continuation-in-part of Ser. No. 968,790, Dec. 12, 1978, Pat. No. 4,251,029, and Ser. No. 62,021, Jul. 30, 1979, Pat. No. 4,270,695.

[51] Int. Cl.³ .............................................. B60H 1/04

[52] U.S. Cl. ..................................... 237/12.1; 165/43; 165/101; 165/126

[58] Field of Search ................ 237/12.1; 165/101, 51, 165/43, 126, 127

[56] References Cited

U.S. PATENT DOCUMENTS

| | | | |
|---|---|---|---|
| 1,278,414 | 9/1918 | Arneil | 165/126 |
| 1,366,900 | 2/1921 | Benson | 165/101 |
| 1,969,187 | 8/1934 | Schutt | 237/12.1 X |
| 2,169,109 | 8/1939 | Muller | 165/126 X |
| 2,452,170 | 10/1948 | Wenger | 165/126 X |
| 3,672,445 | 6/1972 | Carson | 165/42 |
| 4,046,320 | 9/1977 | Johnson et al. | 237/51 X |
| 4,065,055 | 12/1977 | De Cosimo | 237/12.1 |
| 4,071,082 | 1/1978 | Economides | 165/101 |

FOREIGN PATENT DOCUMENTS 467892 9/1950 Canada .

*Primary Examiner*—William E. Tapolcai

*Attorney, Agent, or Firm*—Kerkam, Stowell, Kondracki & Clarke

[57] ABSTRACT

A service module has an internal combustion engine to drive an air compressor and/or other equipment. The internal combustion engine has a cooling system including first and second indirect heat exchangers. A housing is provided including a blower, with a fixed baffle in the housing dividing the air output from the blower into first and second paths. The first and second indirect heat exchangers are located on each in the air paths. A three-way valve located in the cooling system directs the cooling fluid to one or the other of the two heat exchangers.

4 Claims, 5 Drawing Figures

HEATING AND COOLING SYSTEM FOR SERVICE MODULE

DESCRIPTION

CROSS REFERENCE TO RELATED APPLICATION

This Application is a continuation-in-part of my copending Application Ser. No. 968,790, filed Dec. 12, 1978, and entitled, UNDERGROUND SERVICE MODULE, now U.S. Pat. No. 4,251,029 and Application Ser. No. 62,021, filed July 30, 1979, and entitled, UNDERGROUND SERVICE MODULE now U.S. Pat. No. 4,270,695.

TECHNICAL FIELD

This invention relates to an improved heating and cooling system for a module for servicing closed working areas such as manholes by providing heated and ambient ventilating air for the workmen and compressed air and electrical power for operating tools.

BACKGROUND OF PRIOR ART

In our urban society a majority of utilities are routed via underground conduits. Access to the conduits is provided at key locations by way of manholes whereby workmen may descent into the conduits and repair or add utility facilities. This work is normally time consuming and the workmen must remain in the underground conduits for extended periods of time. The conduits are not ventilated and therefore noxious and poisonous gases may accumulate therein and create an atmosphere which is hazardous to their health. Therefore, it has been a practice to provide ventilating air to a manhole by way of a small, portable, engine driven squirrel cage type fan. These fans are usually carried by service trucks when not in use and deployed by placing them on the ground adjacent to the manhole being serviced. This results in the fan scavenging noxious gases from the surface, such as exhaust fumes from the engine driving the fan, and forcing them into the area being serviced where they contribute to the unhealthy atmosphere rather than improve it. Furthermore, this air can be extremely cold in the winter and hamper the servicemen. This is overcome by attaching a propane heater to the blower fan housing. This provides heated air but it creates logistics problems in setting up the bulky heating equipment and fuel source near the manhole in an area which may be a crowded city street.

Servicemen working in underground conduits require compressed air and electricity to drive their tools and provide a means to illuminate the work area. This is usually supplied by an air compressor and electrical generator, both of which are positioned on the surface near the manhole. This results in a large amount of equipment deployed about a manhole and creates significant traffic disruptions. Furthermore, the time required to deploy the various components required to service workmen in a manhole greatly increases the cost for accomplishing a predetermined job in a conduit.

These drawbacks have been partially overcome by systems such as that disclosed in U.S. Pat. No. 3,672,445 issued to T. Carson on July 27, 1972. This Patent discloses a truck mounted system which utilizes the prime motor driven generator to provide electric power for an electrically driven air compressor and high-volume low pressure air ventilation system. The Carson system also includes a heat exchanger wherein hot water from the truck engine heats the ventilating air supplied via the low-pressure, high-volume portion of the system.

Truck mounted systems such as disclosed in Carson U.S. Pat. No. 3,672,445 must be permanently installed in the vehicle due to the water and electrical interconnections between the system and the vehicle engine. Therefore a truck must be designated as a manhole service truck and this results in a significant capital expenditure for each manhole support service system. Operation of the system is also uneconomical because it requires that the engine of the truck be run constantly while the service module is in operation.

This is costly not only in fuel consumed but also in the useful life of the truck engine since it is being operated in an environment for which it was not originally designed.

An underground service module presented in copending Patent Applications Ser. No. 968,790, filed Dec. 12, 1978, and Ser. No. 62,021, filed July 30, 1979 in the name of Miles T. Carson have solved many of the problems existing in prior art service systems. However, the underground service module disclosed in the copending patent applications while providing many needed features, fail to include safety features and simplicity of mechanical components which will permit remote control of the conditioned air and the heat exchange systems were not optimized for maximum efficiency and ease of repair and maintenance.

OBJECTIVES OF THE INVENTION

In view of the preceding, it is a primary objective of the present invention to provide a self-contained service module which includes a water cooled internal combustion engine adapted to drive a water cooled air compressor, a ventilation fan, and an alternator.

A further objective of the present invention is to provide a means whereby ventilation air may be heated by the waste heat of the internal combustion engine and air compressor of a self-contained underground service module.

A still further objective of the present invention is to provide a means whereby the plural radiators of a self-contained underground service module may be connected into or out of the ventilation air supply as required by environmental conditions.

A still further objective of the present invention is to provide control means for a pair of heat exchange radiators for extracting heat from the cooling fluids utilized by an internal combustion engine and air compressor of a service module which control means may be a simple valve to direct heat into the ventilating air plenum when heated ventilated air is required or disconnected from the ventilating air plenum when heated ventilating air is not required.

A still further objective of the present invention is to provide a liquid cooled muffler and an exhaust gas heat exchanger for the internal combustion engine of a service module whereby heat extracted from the exhaust gases of the internal combustion engine may be utilized to heat ventilating air supplied by the system.

SUMMARY OF THE INVENTION

The heating and cooling system of the present invention is intended for an underground service module which is self-contained and may be transported in a variety of vehicles to a work site where it will provide conditioned air to an underground utilities conduit and compressed air and electrical power for tools, service equipment and illumination means. The module provided with the improved heating and cooling system includes a water cooled internal combustion engine which drives an alternator and water cooled air compressor by way of belt drives.

In such a module a low pressure blower, which preferably is of the squirrel cage type, is driven by the internal combustion engine of the module. The blower is mounted in a heat exchanger housing and the input air from the blower is divided by a fixed baffle or separator into two streams or flow paths. First and second indirect heat exchangers are mounted across the pair of air streams and conduit means connect each of the indirect heat exchangers to a source of heated fluid from at least the cooling system for the internal combustion engine. Independent first and second air outlets means for the indirect heat exchangers. First duct means connecting the first outlet means to a zone to be ventilated. Second duct means are employed to connect the second outlet means from the second heat exchange with an exhaust outlet. The improved system further includes a three way valve whereby an operator can direct the source of heated fluid selectively to either the first or second heat exchangers or to both the first and second heat exchangers.

DESCRIPTION OF THE INVENTION

Figure 1:
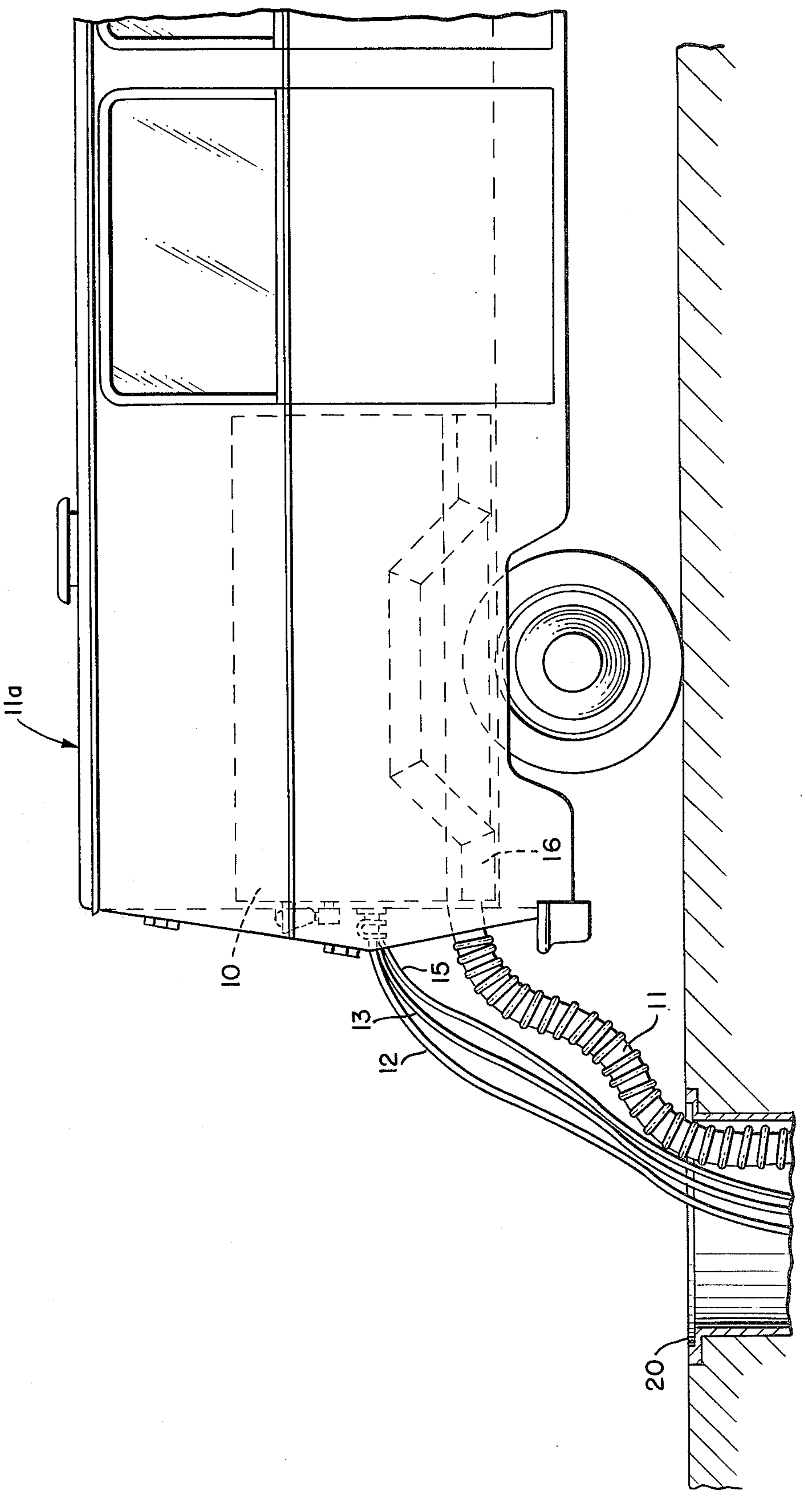
FIG. 1 illustrates the underground service module positioned in the rear of a truck with the conditioned air conduit entering a manhole.

FIG. 1 illustrates the underground service module 10 within a truck 11*a* and deployed alongside a manhole 20. The service model is designed so that it may function within the truck or be placed on the ground alongside the manhole to free the truck for other service. Conditioned ventilating air is supplied to the manhole by collapsible duct 11 and pressured air is made available at work area by high and low pressure air hoses 12 and 13, respectively. Electrical current provided by the alternator of the service module is available on electrical extension 15 which may be terminated by a multi outlet receptacle.

Details of the construction of the module but for the heating and cooling means for the module and personnel will be found in my co-pending applications Ser. Nos. 968,790 and 62,021 hereinbefore identified.

Figure 2:
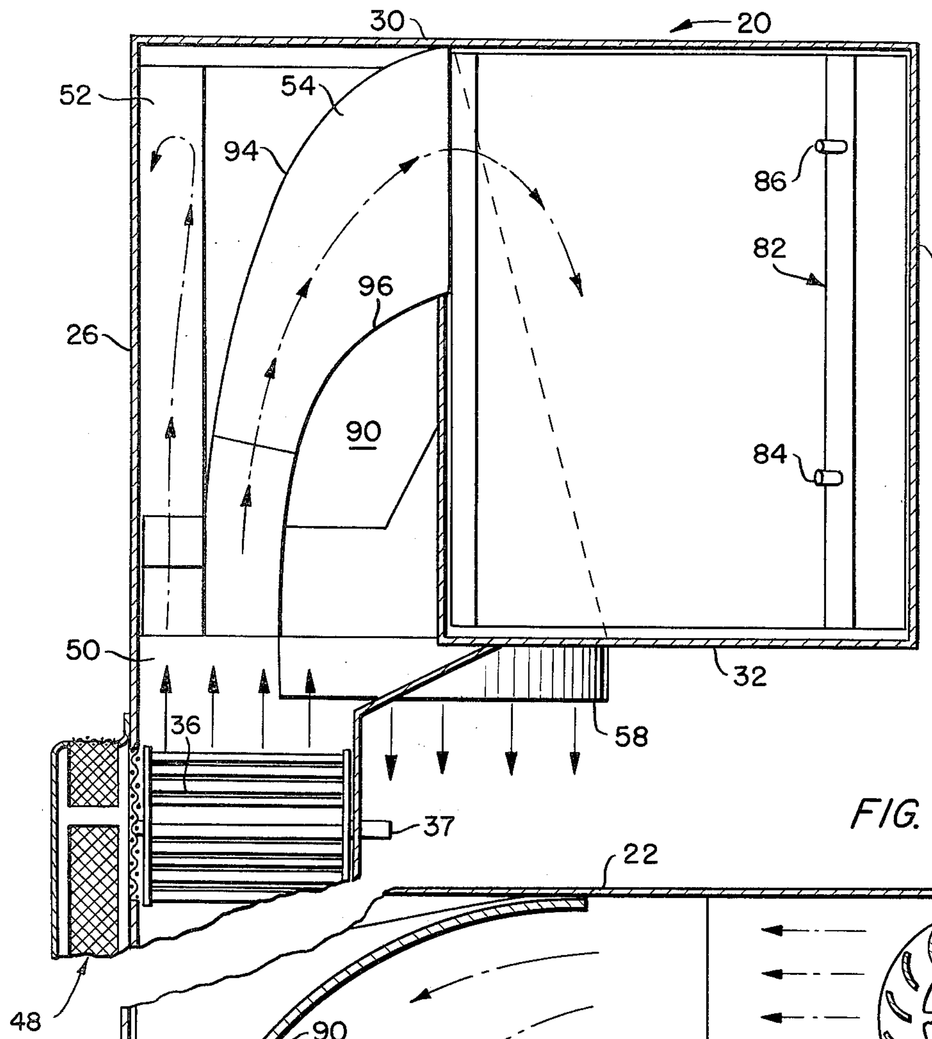
FIG. 2 is a top view, in partial section of the heat exchange system of the invention.
Figure 3:
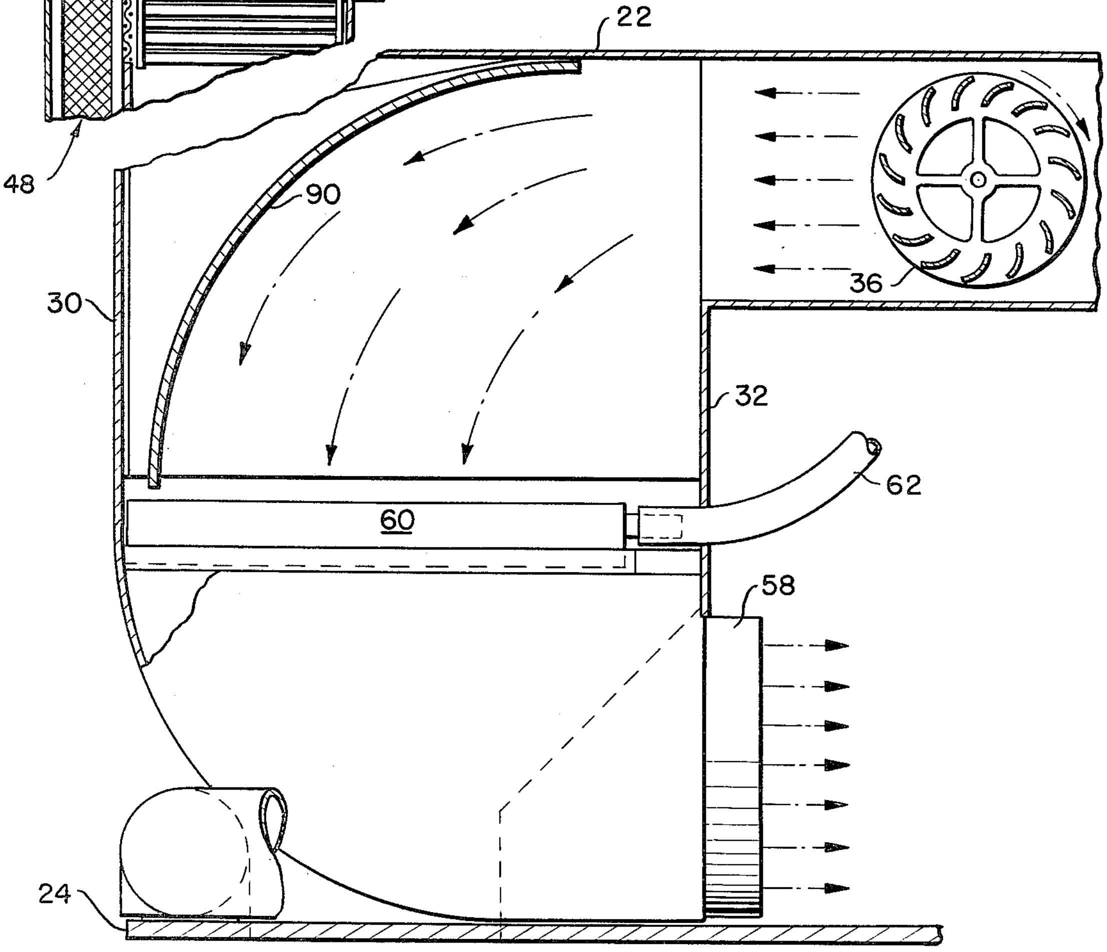
FIG. 3 is a side view, with the skin removed, of the heat exchange system shown in FIG. 2.
Figure 4:
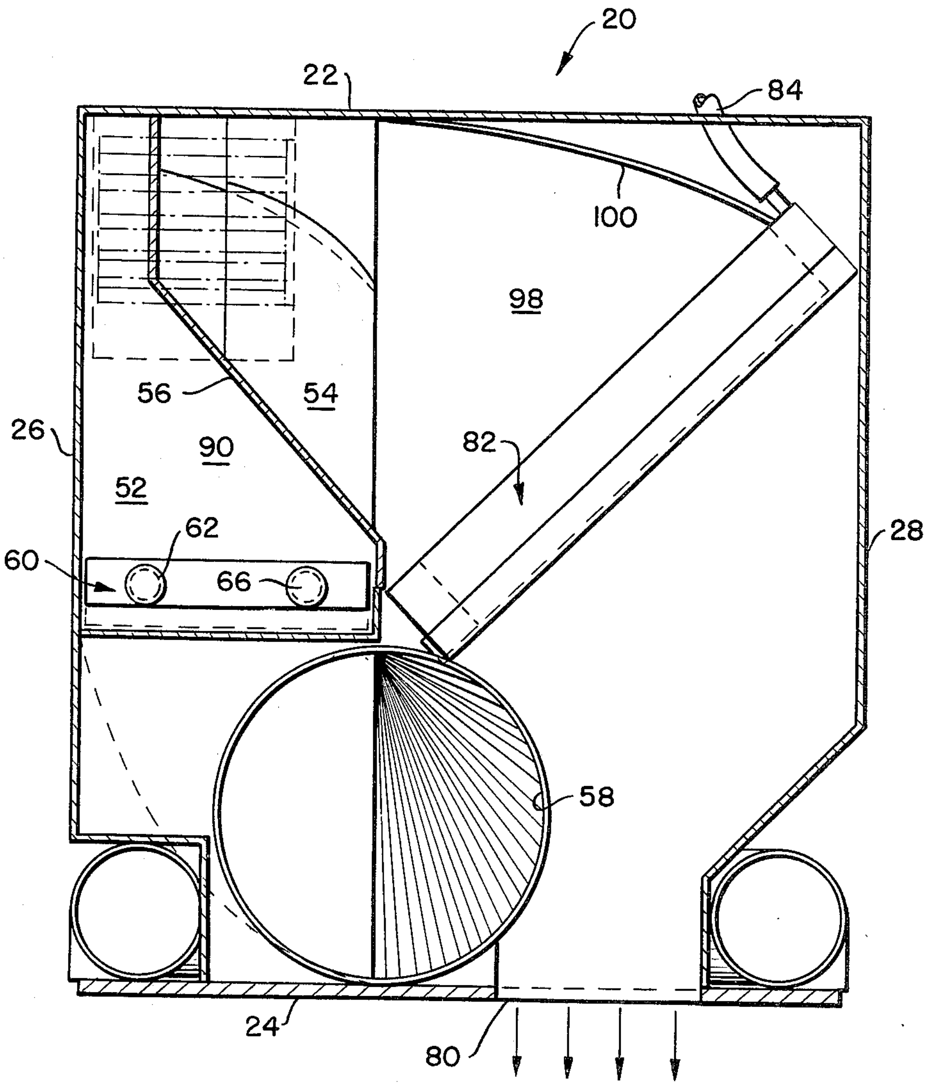
FIG. 4 is a front view of the heat exchange system shown in FIGS. 2 and 3 with a portion of the skin removed.

Referring now particularly to FIGS. 2 through 4 the heart of the heating and cooling system for the personnel is generally designated 20. The unit 20 includes a top wall 22, bottom wall 24, side walls 26 and 28 and end walls 30 and 32.

Figure 5:
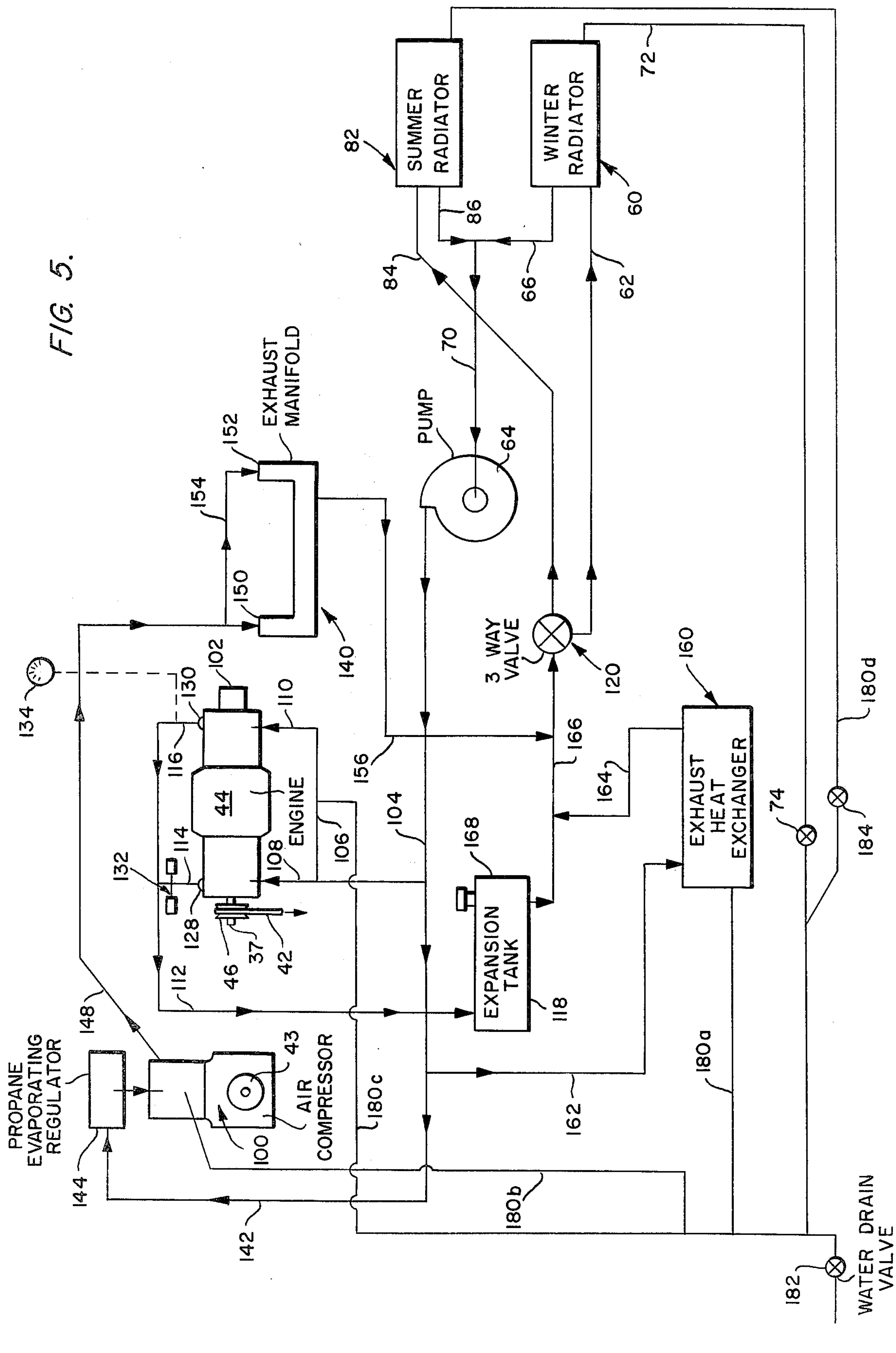
FIG. 5 is a schematic diagram of the coolant circuit of a preferred model of the invention.

In a portion of the housing is rotably mounted a squirrel cage fan 36 which is directly connected to the output shaft 37 of the internal combustion engine 44 FIG. 5 of the drawing. Intake air for the fan 36 is via screen opening 48 mounted to side wall 26 of the unit 20.

The motor shaft 37 also mounts a pulley 38 which drives the air compressor 100 via endless drive belt 42 and compressor pulley 43.

The fan 36 directs air into an inlet plenum 50 which inlet plenum is divided into first and second inlet zones designated 52 and 54 by a partition 56. Basically the inlet duct 54 has a larger volume than the inlet duct 52. The inlet duct 52 directs the incoming air after being conditioned if needed to an outlet duct 58 which outlet duct 58 is connected to the duct 11, FIG. 1 which directs the air stream into the work zone for the personnel.

Mounted across the duct 52 between the inlet and the outlet 58 of the heat exchanger housing 20 is a first indirect heat exchanger or radiator generally designated 60.

The radiator 60 is connected to a source of heated fluid via conduit 62 and to the cooling liquid pump 64 (FIG. 5 of the drawing) via conduits 66 and 70. The radiator 60 designated "winter radiator" in FIG. 5 is also provided with a drain line having a valve 74 associated therewith. The plenum chamber 54 is provided with an exhaust air outlet 80 and between the air inlet and the air outlet 80 is mounted a second heat exchanger generally designated 82. The heat exchanger 82 in the illustrated form of the invention is of a larger capacity than radiator 60 and in FIG. 5 of the drawing the radiator 82 is designated as the "summer radiator". The summer radiator 82 is connected to the source of fluid to be cooled via conduit 84 and a return line designated 86 communicates with line 70 and pump 64.

In order to provide for non-turbulent air flow the passageway between the fan 36 and the winter radiator 60 has a curvilinear baffle 90 more clearly shown in FIG. 3. Further, a pair of curved baffles 94 and 96 FIG. 2 of the drawing direct the air stream in the passage 54 into the large plenum 98 FIG. 4 of the drawing. Further, a curved baffle 100 provides for a continuous smooth transition of the air from the passage 54 to and through the summer radiator 82.

Referring now specifically to FIG. 5 of the drawing, the liquid flow path of the liquid to be cooled is illustrated schematically.

The internal combustion engine 44 which drives the fan 36, the pump 64, the compressor 100 and an alternator 102 is of the water cooled type and the coolant from the summer and/or winter radiator is pumped via pump 64 through coolant lines 104, 106, 108 and 110 to the cooling jacket of the engine. The heated fluid leaves the cooling jacket via main line 112 and branch lines 114 and 116 to the expansion tank 118 thence through the 3-way valve generally designated 120. The 3-way valve directs the heated fluid into the summer radiator 82 or the winter radiator 60 or both via conduit 84 and 62 at the selection of the operator.

Each of the output conduits 114 and 116 is provided with a thermostatic valve 128 and 130 which controls the flow rate from the engine 44. Further, as a safety measure a temperature actuated solenoid switch means 132 is provided in the offtake line 114 which will automatically shut down the engine in the event of overheating. Further, where desired a water temperature gage 134 may be provided in the system.

In addition to the normal cooling jacket for the engine 44 the exhaust manifold 140 is of the liquid cooled type and coolant via lines 104 and 142 is directed to the propane evaporating regulator 144 for the air compressor 100 and to the compressor. The output from the air compressor, via conduit 148, is directed to the water cooling inlet port 150 of the exhaust manifold 140. A further inlet port 152 of the exhaust manifold is supplied with coolant via conduit 154. The heated fluid from the exhaust manifold flows via conduit 156 fo the hereinbefore described three-way valve 120.

The system also includes an exhaust gas heat changer generally designated 160. The exhaust gas heat exchanger provides a useful addition to the module as it provides additional heat in the winter.

The exhaust heat exchanger 160 is provided with coolant from the pump 64 via line 104 and 162. The heated coolant from the gas heat exchanger 160 flows via line 164 and line 166 (issuing from the expansion tank 168 to the three-way valve 120.

The systems also includes drain lines 180*a,* 180*b* 180*c* and 180*d* provided with valves 182 and 184 to permit draining of the system for cleaning, etc.

SUMMER OPERATION

During summer operation of system disclosed herein a three-way valve 120 is set to direct the coolant to be cooled to the summer radiator 82 only. Thus the radiator 60 in the flow path of air being directed to the personnel in a manhole or the like is not provided with coolant and the personnel only receives air at ambient temperatures.

SPRING AND SUMMER OPERATION

During the Spring and Fall the valve 120 would probably be set to deliver heated coolant to both radiators 60 and 82 so that the personnel working there in, for example, would receive some heat in their ventilating air and the remainder of the cooling capacity required to maintain the unit at the proper operating temperature would be dissipated through the summer radiator 82.

WINTER OPERATION

During operation of the sytem during the cold winter times all of the coolant would be directed to the winter radiator 60 so that maximum heat would be available for the personnel.

The above three settings are given by way of example only and it will be apparent to those skilled in the art that various combinations of the settings described herein may be made as described.

I claim:

1. In a self contained service module of the type having at least a liquid coolant cooling system for an internal combustion engine and an air compressor; the improvement comprising heat exchange means including, a heat exchange housing, a low pressure air blower mounted in the housing, a fixed baffle in the housing dividing the air output from the blower into first and second independent air streams or flow paths, first and second indirect heat exchangers, means mounting the first indirect heat exchanger across the first air streams, means mounting the second indirect heat exchanger across the second air stream, conduit means connecting each indirect heat exchanger to a source of heated liquid from at least the cooling system for the internal combustion engine; independent first and second air outlets means one for each said first and second indirect heat exchangers; first duct means connecting the first outlet means to a zone to be ventilated; second duct means connecting the second outlet means from the second heat exchanger with an exhaust outlet; and a three way valve mounted in the conduit means connecting the indirect heat exchangers to the source of heated liquid, said three way valve operational to direct heated fluid from said source selectively to either the first or second heat exchanger or to both the first and second heat exchangers.

2. The heat exchange means as described in claim 1 further including a high pressure compressor and a liquid cooling jacket therefor, said jacket having fluid communication with and forming part of the said source of heated liquid.

3. The heat exchange means as defined in claim 2 further including a liquid cooled manifold and a liquid cooled exhaust heat exchanger, and conduit means connected to said exhaust manifold and exhaust heat exchanger and connected to the source of heated liquid.

4. The heat exchange means defined in claim 3 wherein the pressure air blower mounted in the housing comprises a squirrel cage axial inlet blower.

* * * * *